July 21, 1964  E. LANGECKER  3,141,196
APPARATUS FOR INFLATING HOLLOW BODIES FROM
RIBBONS OF THERMOPLASTIC MATERIAL
Filed March 31, 1961  2 Sheets-Sheet 1
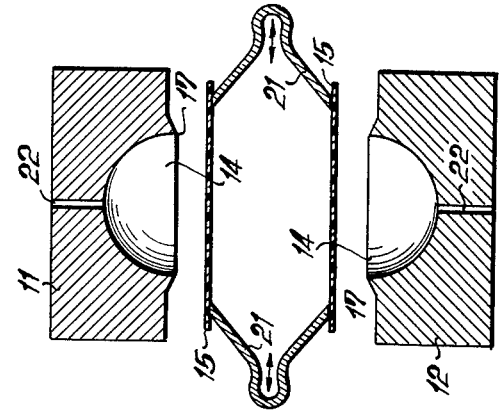
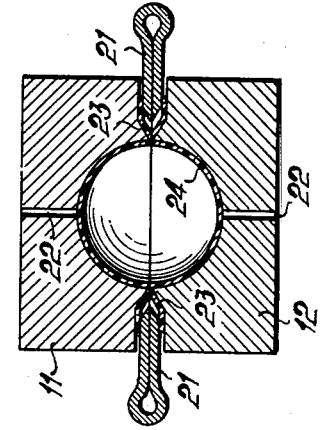
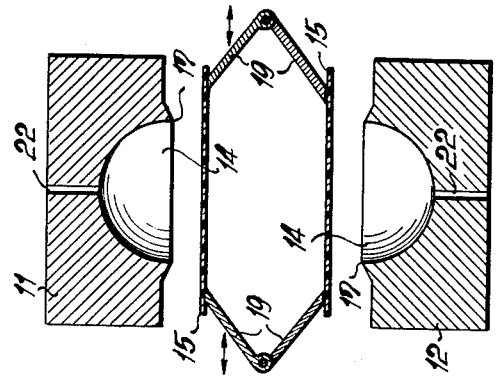
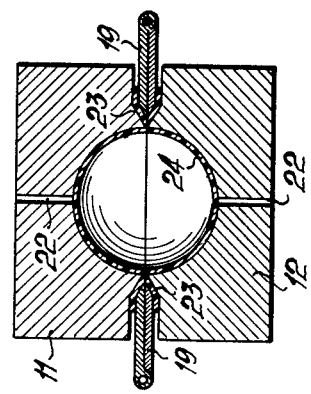
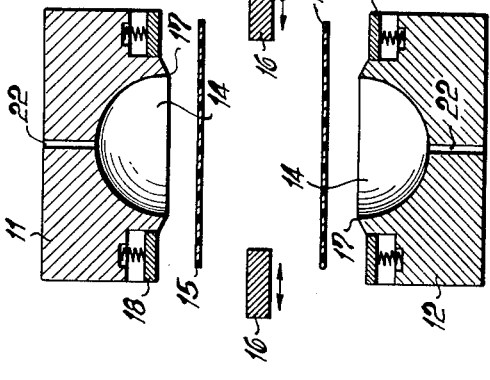
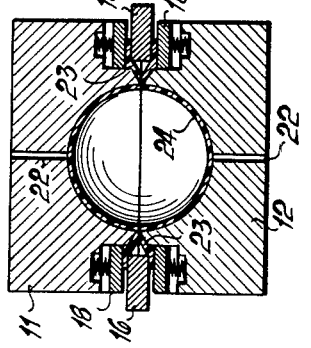
INVENTOR
Erhard Langecker
By Ernest G Montague
Attorney

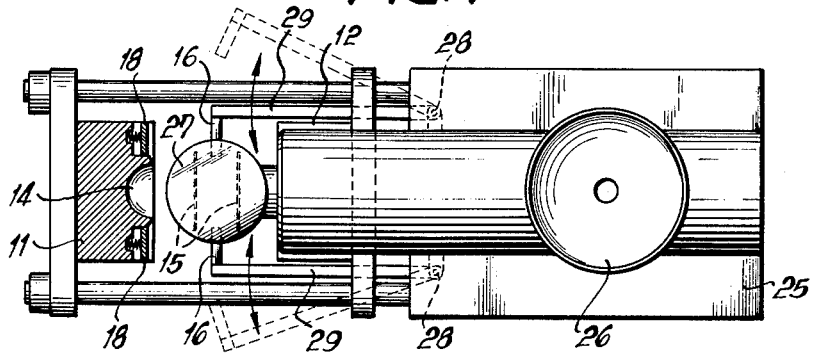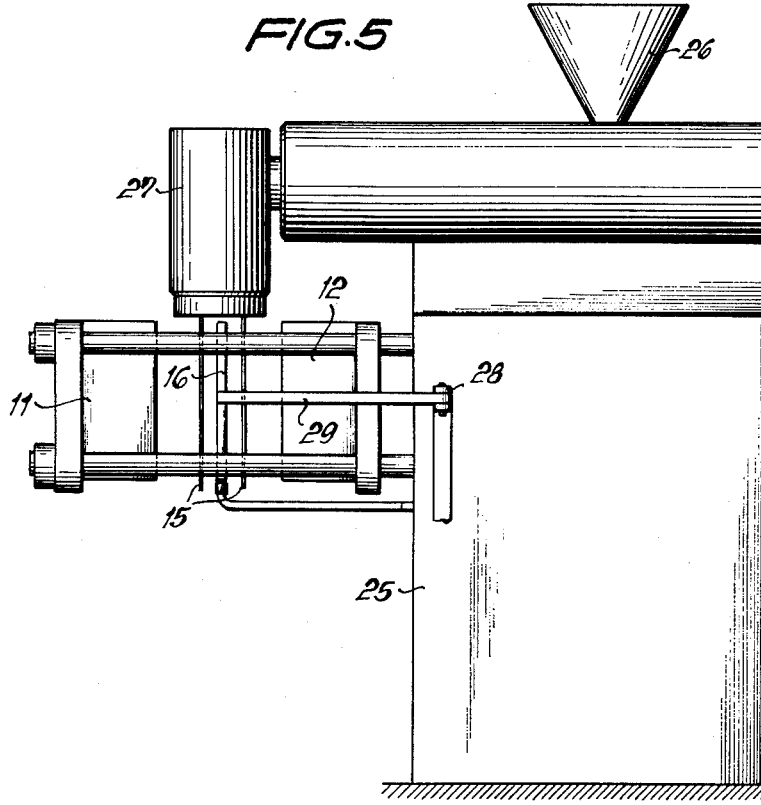

United States Patent Office 3,141,196
Patented July 21, 1964

3,141,196
APPARATUS FOR INFLATING HOLLOW BODIES FROM RIBBONS OF THERMOPLASTIC MATERIAL
Erhard Langecker, Meinerzhagen, Westphalia, Germany, assignor to Firma Gebruder Battenfeld, Meinerzhagen, Westphalia, Germany, a corporation of Germany
Filed Mar. 31, 1961, Ser. No. 99,757
Claims priority, application Germany Apr. 1, 1960
6 Claims. (Cl. 18—19)

The present invention relates to apparatus for the fabrication of hollow bodies from ribbons or bands composed of thermoplastic material, and more particularly to an improvement in apparatus for the handling of such hollow bodies during their manufacture so as to effect a more reliable sequence of operations.

Two ribbons or bands of synthetic material still in the plastic state have heretofore been formed into hollow shapes by inflation by means of gas under pressure within a suitable mold or form. This operation has the advantage over the forming by inflation starting from a hose, especially when such shapes or parts have large areas and few recessed portions in that it provides more favorable operative conditions which are similar to those prevailing when inflation-shaping from an ovaloid hose. However, in the case of an ovaloid hose the handling and centering of the inflating gas jet, as well as the adjustment thereof in respect to an asymmetrical movement of the mass to be shaped is somewhat difficult.

The inflation-shaping of hollow forms from two ribbons heretofore gave rise to the difficulty that when closing the two shaping halves, the two ribbons would be easily stuck together and an inflation would thereby be prevented. In order to avoid this disadvantage, in accordance with the present invention, it is proposed to support the two ribbons along their entire periphery or only along their vertical longitudinal edges by means of separator strips which extend between the ribbons and are actuated before the opening of the mold or form. Through the medium of these separating strips, the two ribbons are dependably maintained separate one from the other at a suitable distance during the closing of the form, so that it would not be possible for them to come into contact with one another.

It is accordingly one of the objects of the present invention to provide an improved apparatus for making hollow bodies or shapes from thermoplastic ribbons.

It is a further object of the present invention to provide an apparatus of the type referred to which will avoid the difficulty heretofore encountered by the undesired contact during or before the inflation of the two ribbons for forming of hollow bodies.

It is a still further object of the present invention to provide an improved device for making hollow plastic bodies which includes separators for the two ribbons which become operative at a desired point during the process of manufacture.

In accordance with various embodiments of the present invention the separators may be made rigid, or collapsible somewhat in the manner of a piano hinge. It is further possible to make the separators resilient in the form of an expansion spring having a U or hairpin cross-section.

In order to accommodate these separators during the closing of the mold or shaping form, the form walls may be provided with corresponding recesses, the sides of which in one preferred example may be made resilient as by spring loading.

Accordingly, a still further object of the present invention is to provide separating elements for the plastic ribbons during or before the closing of the shaping mold which may be rigid, closable or flexible.

In any case, the ribbons will be maintained at such a distance from one another through the medium of the interposed separators that they will be prevented from mutual contact. It is therefore possible, in a manner known in itself, to operate with an inner starting atmospheric pressure within the space between the ribbons and the separators which is already at a value somewhat higher than that in the space between the ribbons and the form.

In accordance with another feature of the present invention it is possible to operate under atmospheric pressure in the space between the ribbons the form itself being provided with air discharge passages so that in the space between the ribbons and the shaping form a corresponding under-pressure may be attained.

It is still another object of the present invention to provide an apparatus of the type described which may be operated in a suitable manner under air pressure conditions which are favorable for the desired inflation-shaping.

It is, of course, understood that the two ribbons may be produced, respectively, from separate extruders. It is thereby possible to fabricate hollow bodies which possess a different color for each of its halves and wherein the closing seam also comprises a color separating line. It may also be possible when using two extruders to utilize both broad band nozzles and to thereby obtain within a single ribbon multi-colored longitudinal stripes as already known in the case of inflation from a hose. A much more symmetrical effect may be achieved when inflating from ribbons compared to inflation-shaping from a circular hose when striped products are desired.

With these and other objects in view which will become apparent in the following detailed description, the present invention will be clearly understood in connection with the accompanying drawings, in which:

FIGURE 1 is a cross-section of the plastic ribbon shaping device in plan view showing rigid separator strips;

FIG. 2 is a similar view of the device incorporating piano hinge-type separators;

FIG. 3 is similarly a plan view of the appartus in cross-section with resilient, spring-type separators;

FIG. 4 is a plan view of a plastic band extruding apparatus including an improved ribbon inflation-shaping device, in accordance with the present invention; and FIG. 5 is a view in elevation of the apparatus of FIG. 4.

The three views of the ribbon shaping device are shown in such a way that the left half of the inflation-shaping hollow body form or mold is illustrated in the open and the right half in the closed position. The left portion of FIG. 1 shows the shaping form halves 11 and 12 in the open position, while the thermoplastic ribbons 15 being shown suspended vertically thereinbetween as they are produced from an extruder output nozzle either directly or indirectly. The extruder has been omitted from this view.

Two separating members or strips 16 are disposed between the ribbons 15 and are shown positioned alongside the longitudinal edges of the ribbons. However, the separating strips 16 may also be disposed along the entire periphery of the ribbons and as indicated by arrows may be movable toward the outside by any conventional means. During the closing of the mold form the separators 16 prevent the coming together or mutual contact of the two ribbons 15. At the closing movement of the mold portions 11 and 12, the ribbons 15 are clamped and compressed between the separating members 16 and the spring biased wall portions 18 of the mold. The hollow space between the ribbons is thereby sealed off in respect to the outside, so that it is possible to effectuate a pneumatic separation by means of an air jet nozzle directed between the two ribbons or by means of a needle penetrating one of these ribbons during the sealing operation. This makes it possible to introduce gas under pressure between the ribbons during the sealing operation, so as to cause an outward movement of the ribbons into the hollow form 14 and to, thereby, reliably prevent the coming together and mutual contact and sticking of the ribbons 15. In completing the sealing operation, the two ribbons 15 are welded along their edges by means of the compression edge 17, as has been the practice with celluloid plates for many years, and at the same time the completed inflated hollow body 24 is separated completely or partially from the waste material 23.

During the initiation of the opening movement of the mold the separators 16 are moved outwardly and the inflated hollow body is removed from the mold halves 11 and 12 by means of the spring-biased wall portions 18.

In the case of a vertical form separation, it is possible to remove the inflated member straight downwardly from the mold and to thereby achieve a completely automatic operation. The embodiment of the separators 16 is not necessarily as illustrated. It may well be conical in order to facilitate a downward extraction after the completed inflation operation. It is further possible to either render the spring biased wall portions 18 or the separating members 16 such that the wall thickness of the plastic ribbons 15 is compressed only to a slight extent.

The arrangement of the device, as in FIG. 1, with respect to a complete hollow body inflating machine is shown in the plan view of FIG. 4, as well as in an elevation in FIG. 5. In these views an apparatus frame 25 carries an input funnel 26 for the reception of the thermoplastic mass. At the output end of the machine there is provided above the device 11, 12, an extruder 27 for producing ribbons 15 which in its construction and operation is known in itself, and which receives plastic material by way of the funnel 26, as will be recognized by those familiar with the art. The separators 16 are arranged in bearings 28 of the frame 25 in such a way as to be controllable by means of movable levers 29, the movement of the levers 29 being performed by any conventional means which do not constitute any part of the present invention.

A further embodiment is shown in FIG. 2 in which instead of the rigid separator strips 16 and the spring biased wall portions 18 the same function is exericsed by means of a piano-hinge-type linkage 19, which is maintained in an open or spread condition by means of spring actuation (not shown).

A further possibility is shown in FIG. 3 wherein in place of the separator an expansion or spreading spring of spring steel is utilized. In FIGS. 1, 2 and 3 vacuum nozzles are indicated at 22 which may be utilized in those cases wherein an initial inflation through a nozzle between the ribbons 15 is not possible.

While I have disclosed several embodiments of the present invention, it is to be understood that these embodiments are given by way of example only and not in a limiting sense, the scope of the present invention being determined by the objects and the claims.

I claim:
1. An apparatus for the fabrication by inflation-molding of hollow bodies from two ribbons of synthetic material to be thermoplastically sealed along their edges comprising
   means for extruding two plastic ribbons substantially parallel relative to each other to define an open space therebetween,
   means forming a hollow inflation-mold connected with said extruding means and comprising two separable mold halves receiving said plastic ribbons therebetween and defining a cavity therein,
   said mold halves being movable from a spaced apart position having said two plastic ribbons therebetween to an engaging closed position having said plastic ribbons engaging their inner walls,
   each of said mold halves having a laterally disposed recess in the face engaging the other of said mold halves adjacent to said cavity in said mold, and
   a separating member disposed between each pair of said oppositely located recesses of said mold halves,
   resilient means to urge said separating members into engagement with said plastic ribbons and to permit closing of said mold halves during said engagement, thereby sealing airtightly the space defined between said plastic ribbons prior to said closing of said mold halves and during the closing period up to the closing of said mold halves, in order to prevent safely a sticking together of said plastic ribbons.
2. The apparatus, as set forth in claim 1, wherein said separating members comprise rigid strips disposed parallel and alongside the longitudinal edges of said two plastic ribbons.
3. The apparatus, as set forth in claim 1, wherein said mold halves have in said recesses spring biased wall portions for resiliently receiving said separating members.
4. The apparatus, as set forth in claim 1, wherein said separating members comprise collapsible hinge-like formations.
5. The apparatus, as set forth in claim 1, wherein said separating members comprise compressible normally open spring loaded expansion members.
6. The apparatus, as set forth in claim 1, wherein each of said mold halves includes coacting edge means for compressing and sealing the longitudinal edges of said two plastic ribbons in the closed position of said mold halves.

References Cited in the file of this patent
UNITED STATES PATENTS

| | | |
|---|---|---|
| 1,201,502 | Roberts | Oct. 17, 1916 |
| 1,243,371 | Willard | Oct. 16, 1917 |
| 1,404,320 | Roberts et al. | Jan. 24, 1922 |
| 1,564,366 | Overton | Dec. 8, 1925 |
| 2,991,500 | Hagen | July 11, 1961 |

FOREIGN PATENTS

| | | |
|---|---|---|
| 1,138,504 | France | Jan. 28, 1957 |